United States Patent
Johnson et al.

(10) Patent No.: US 12,188,230 B2
(45) Date of Patent: Jan. 7, 2025

(54) FIRE-RATED STRUCTURAL OSB PANELS WITH OVERLAID WATER-RESISTANT BARRIER

(71) Applicant: LOUISIANA-PACIFIC CORPORATION, Nashville, TN (US)

(72) Inventors: Scott Johnson, Nashville, TN (US); Brian St. Germain, Mt. Juliet, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 18/168,518

(22) Filed: Feb. 13, 2023

(65) Prior Publication Data
US 2023/0203811 A1    Jun. 29, 2023

Related U.S. Application Data

(63) Continuation of application No. 17/491,367, filed on Sep. 30, 2021, now Pat. No. 11,578,487.

(60) Provisional application No. 63/085,258, filed on Sep. 30, 2020.

(51) Int. Cl.
*E04C 2/28* (2006.01)
*B32B 21/06* (2006.01)
*B32B 37/15* (2006.01)
*E04B 2/00* (2006.01)

(52) U.S. Cl.
CPC ............... *E04C 2/28* (2013.01); *B32B 21/06* (2013.01); *B32B 37/15* (2013.01); *E04C 2/44* (2013.01); *B32B 2250/02* (2013.01); *B32B 2255/08* (2013.01); *B32B 2255/12* (2013.01); *B32B 2255/20* (2013.01); *B32B 2262/101* (2013.01); *B32B 2305/22* (2013.01);
(Continued)

(58) Field of Classification Search
CPC ... E04B 1/94; E04B 1/66; E04B 1/665; E04B 1/948; E04B 9/04; E04B 9/16; E04B 9/36; E04B 9/366; E04C 2/10; E04C 2/296; E04C 2/28; E04C 2/44; E04D 1/28; E04D 1/00; E04D 1/30; E04D 1/2956; B32B 23/044; B32B 21/06; B32B 37/15; B32B 2250/02; B32B 2555/02; B32B 2555/08; B32B 2555/12; B32B 2262/101; B32B 2305/22; B32B 2305/77; B32B 2305/3065; B32B 2419/00
USPC ....................................... 428/292.4
See application file for complete search history.

(56) References Cited

U.S. PATENT DOCUMENTS

| | | |
|---|---|---|
| 3,164,511 A | 1/1965 | Elmendorf |
| 4,364,984 A | 12/1982 | Wentworth |
| 5,435,976 A | 7/1995 | Berner et al. |

(Continued)

*Primary Examiner* — Camie S Thompson
(74) *Attorney, Agent, or Firm* — Wayne Edward Ramage; Baker Donelson

(57) ABSTRACT

A wood or engineered wood structural panel, such as, but not limited to, OSB ("oriented strand board") or plywood, that is both fire-resistant and water resistant. The panel is factory-coated with a product that provides fire resistance. The treatment gives it a Fire-Resistant (FR) performance (for use in a one- or two-hour rated assembly). The panel also is overlaid or coated in a factory setting with a weather/water resistive barrier (WRB). The structural panel thus combines a fire-resistant structural sheathing and WRB product in one integrated panel produced at a factory prior for installation at a job site.

10 Claims, 6 Drawing Sheets

(52) U.S. Cl.
CPC ... *B32B 2305/77* (2013.01); *B32B 2307/3065* (2013.01); *B32B 2419/00* (2013.01)

(56) References Cited

U.S. PATENT DOCUMENTS

| | | |
|---|---|---|
| 5,470,631 A | 11/1995 | Lindquist et al. |
| 5,525,394 A | 7/1996 | Clarke et al. |
| 5,718,786 A | 2/1998 | Lindquist et al. |
| 6,461,743 B1 | 10/2002 | Tanzer et al. |
| 7,595,092 B2 | 9/2009 | Huddy et al. |
| 7,921,800 B2 | 4/2011 | Huddy et al. |
| 8,112,950 B2 | 2/2012 | Bennet et al. |
| 10,508,438 B2 | 12/2019 | Huddy |
| 2017/0210098 A1 | 7/2017 | Moore et al. |
| 2021/0285216 A1* | 9/2021 | Gutierrez ................ E04D 12/00 |

\* cited by examiner

FIRE-RATED STRUCTURAL OSB PANELS WITH OVERLAID WATER-RESISTANT BARRIER

CROSS REFERENCE TO RELATED APPLICATIONS

This application claims the benefit of and priority to U.S. patent applicaion Ser. No. 17/491,367, filed Sep. 30, 2021, now U.S. Pat. No. 11,578,487, which is incorporated herein in its entirety by specific reference for all purposes.

This application claims benefit of and priority to U.S. Provisional App. No. 63/085,258, filed Sep. 30, 2020, which is incorporated herein in its entirety by specific reference for all purposes.

FIELD OF INVENTION

This invention relates to a manufactured wood structural panel used for structural sheathing that is both fire-resistant and weather/water resistant.

BACKGROUND OF INVENTION

Engineered wood is generally formed from lignocellulosic strands, wafers or particles that are mixed with adhesives and bonded together in a high temperature press (i.e., under heat and pressure). Oriented-strand board ("OSB") is a form of multi-layer engineered wood composite product formed of lignocellulosic strands or wafers. The strands in each layer are positioned relative to each other with their lengths in substantially parallel orientation, and with adjacent layers generally have a different orientation. For example, a three-layer OSB panel is formed by forming a lower mat of oriented strands, laying a core mat of oriented strands on top of the lower mat, and then laying an upper mat of oriented strands on top of the core mat. An overlay may be added on top of the upper layer. The stacked, unconsolidated mats are then inserted to a multi-layer press and subjected to high pressure and heat sufficient to form an integrated product. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes.

Building wall and roof assemblies typically are constructed by attaching several panels of the above described type as to an underlying supporting structure frame as "sheathing." These sheathing panels are often placed in a pattern with the edge of each panel contacting adjacent panels, thereby forming a substantially continuous flat surface. In certain types of construction, the panels (and other construction materials) may be required under applicable building codes to meet certain fire resistance or water resistance requirements.

For certain applications and/or locations, panels or panel assemblies are required to meet certain fire resistance ratings under applicable codes (i.e., Fire-Rated sheathing). Fire ratings indicate that the panel assembly is built to withstand the heat from a fire for a certain period of time before failing. Typical fire ratings are referred to as one- and two-hour ratings. According to the American Standards for Testing Materials (ASTM), for example, a one-hour rating indicates that a wall constructed in a manner similar to the one tested will contain flames and high temperatures, and support its full load for at least one hour after the fire begins. Thus, for example, a Fire-Rated OSB sheathing can be used as a component in a 1-hour or 2-hour UL-listed (Underwriter Laboratories) fire-rated wall assembly. An OSB panel typically has a class C flame spread rating. Non-limiting examples of systems and methods for the coating of a fire-resistant material on a substrate are provided in U.S. Pat. Nos. 7,595,092 and 7,921,800, which are incorporated herein in their entireties by specific reference for all purposes.

Sheathing panels of this type also are often used in construction as part of a structure, and thus are frequently exposed to adverse weather conditions, including rain and other forms of water or moisture. In prior art applications, a fire-resistant panel is installed as sheathing at a job or construction site. After installation, a code-approved water resistant barrier (WRB) system or material is applied. Examples of these WRB systems include housewrap (e.g. Tyvek®, E. I. Du Pont De Nemours And Company, Wilmington, Del.; Typar®, Fiberweb, Inc., Old Hickory, Tenn.), peel-and-stick membranes, or a WRB fluid or liquid applied to the installed panel. However, these systems all rely upon skilled labor for installation at the job. In addition, many of the systems cannot be installed during inclement weather, and require the installed sheathing to be free of defects and provide a clean surface free of debris in order to achieve proper adhesion between the panel and the WRB. As a result, all of these system can be problematic to install on a job site, and often result in improper installation causing failures in the building "envelope," leading to problems such as moisture instruction or mold or mildew growth.

Accordingly, what is needed is a fire-resistant panel with a WRB overlay that avoids the above problems.

SUMMARY OF INVENTION

In various exemplary embodiments, the present invention comprises a wood structural panel, such as, but not limited to, OSB ("oriented strand board") or plywood, that is used for structural sheathing. The panel can be factory-coated with a product that provides fire resistance. In one embodiment, the treatment provide the panel with a Fire-Resistant (FR) performance (for use in a one- or two-hour rated assembly), as described below. The panel also is overlaid or coated in a factory setting with a weather/water resistive barrier (WRB). The invention thus combines a fire-resistant structural sheathing and WRB product in one integrated product produced at a factory prior for installation at a job site, and thus is less reliant on skilled labor for installation at the job site, among other advantages.

The FR panel provides a fire-resistant product that provides structural performance and fire resistance in walls and roofs in residential, single- or multi-family, and commercial construction. In one embodiment, the panel comprises a FR coating applied to at least one face of the panel. In one exemplary embodiment, the FR coating is applied on the face of the panel opposite the WRB. In another exemplary embodiment, the FR coating is applied on the face of the panel with the WRB, with the WRB overlying the FR coating layer. In yet another embodiment, FR coating is applied to both faces of the OSB panel, with a WRB overlying or underlying the FR coating layer on one of the faces.

The FR coating comprises one or more of a fire-resistant coating, non-combustible magnesium oxide coating, non-combustible fiberglass reinforced magnesium oxide coating, surface-applied chemical treatment, and/or intumescent coating, or combinations thereof. This coating allows the panel to be used in approved 1 and 2 hour UL-listed fire resistance wall assemblies. In one embodiment, a fire-resistant coating, as described below is applied to an OSB panel, resulting in a sheathing product that has a class-A extended (30 minute) flame spread rating and is rated in various 1-hour and/or 2-hour UL listed wall assemblies.

DETAILED DESCRIPTION OF EXEMPLARY EMBODIMENTS

In various exemplary embodiments, as seen in FIGS. 1-5, the present invention comprises a wood structural panel 10, such as, but not limited to, OSB ("oriented strand board") or plywood, that is used for structural sheathing. The panel is factory-coated with a fire-resistant product 20 that provides fire resistance. In one embodiment, the treatment gives it a Fire-Resistant (FR) performance (for use in a one or two hour rated assembly), as described below. The panel also is overlaid or coated in a factory setting with a weather/water resistive barrier (WRB) 30. The invention thus combines a fire-resistant structural sheathing and WRB product in one integrated product produced at a factory prior to installation at a job site, and thus is less reliant on skilled labor for installation at the job site, and reduces installation time by eliminating the application of a WRB system in the installation process.

Figure 1:
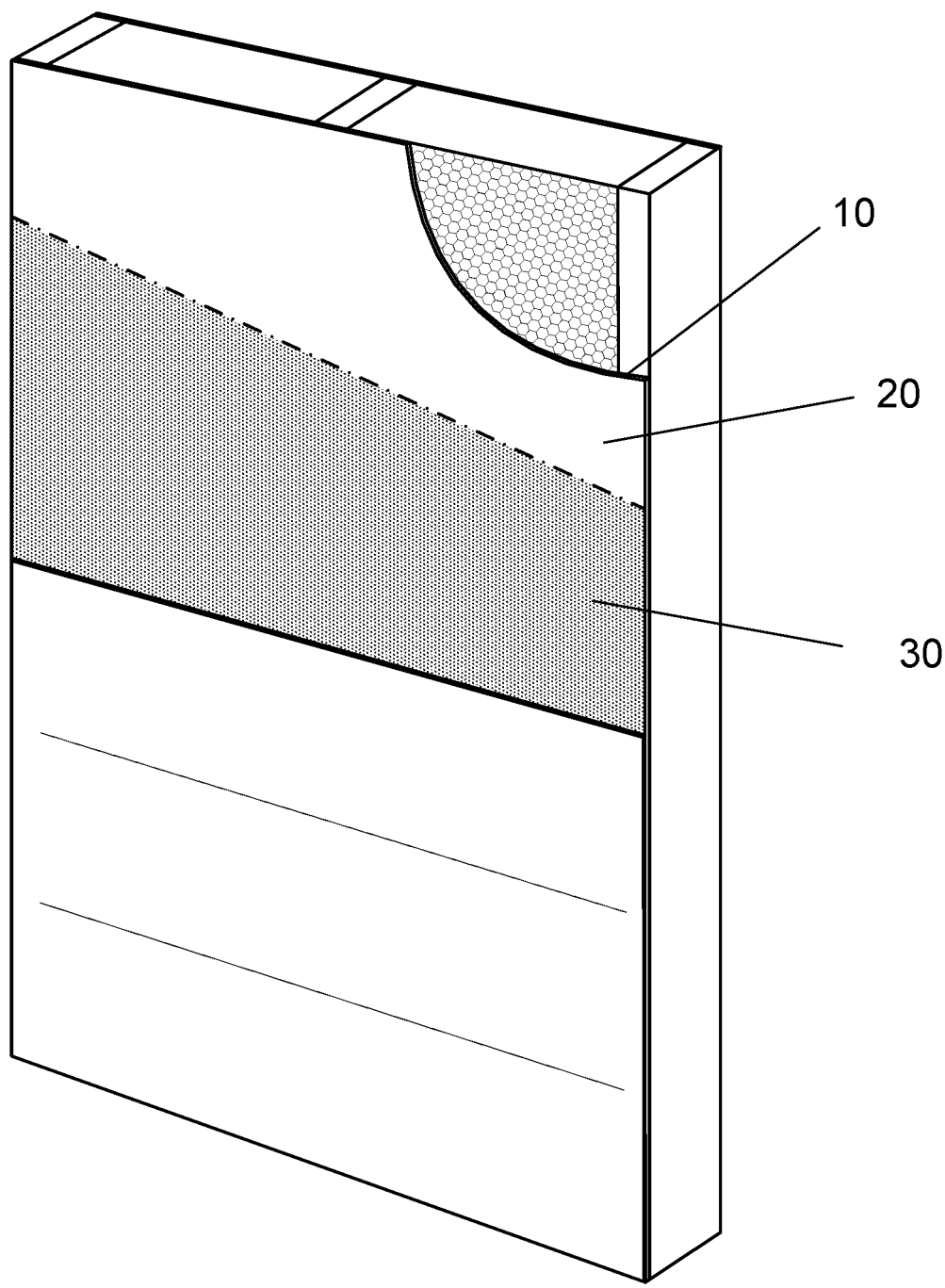
FIG. 1 shows a view of an installed sheathing panel in accordance with an embodiment of the present invention.
Figure 2:
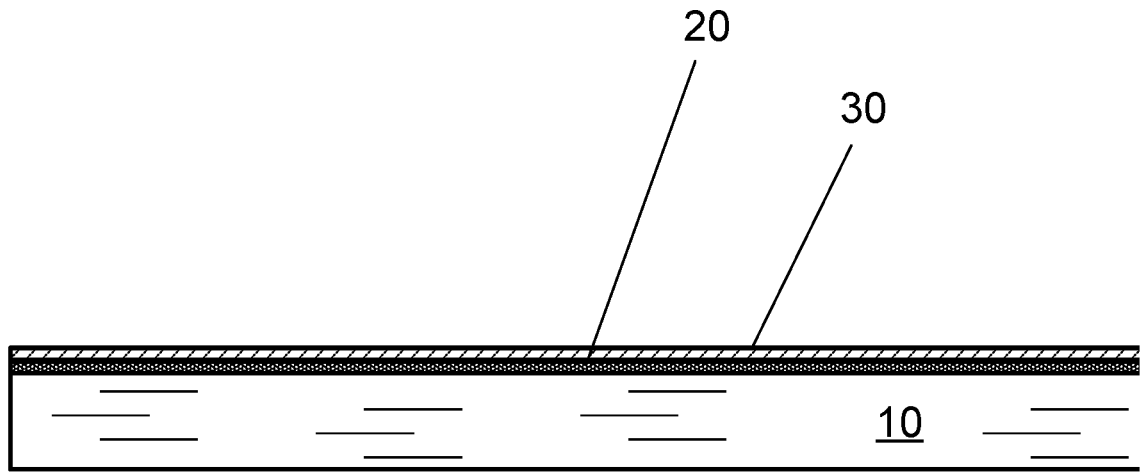
FIG. 2 shows a cross-section of the sheathing panel of FIG. 1.
Figure 3:
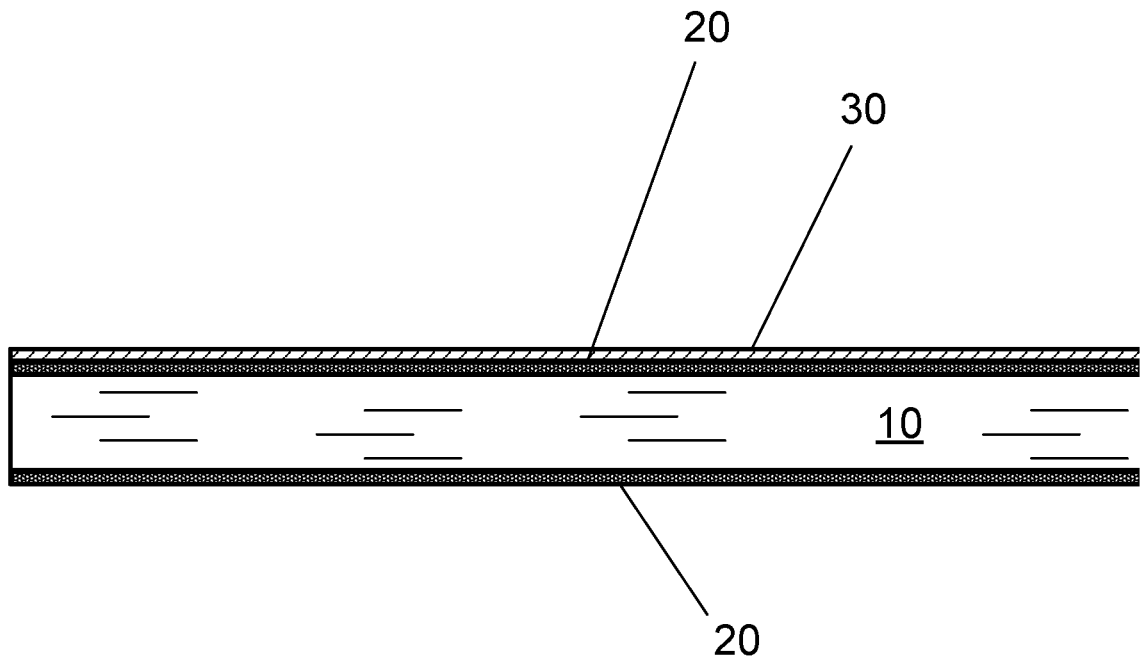
FIG. 3 shows a cross-section of an alternative arrangement of FR and WRB layers on a sheathing panel.
Figure 4:
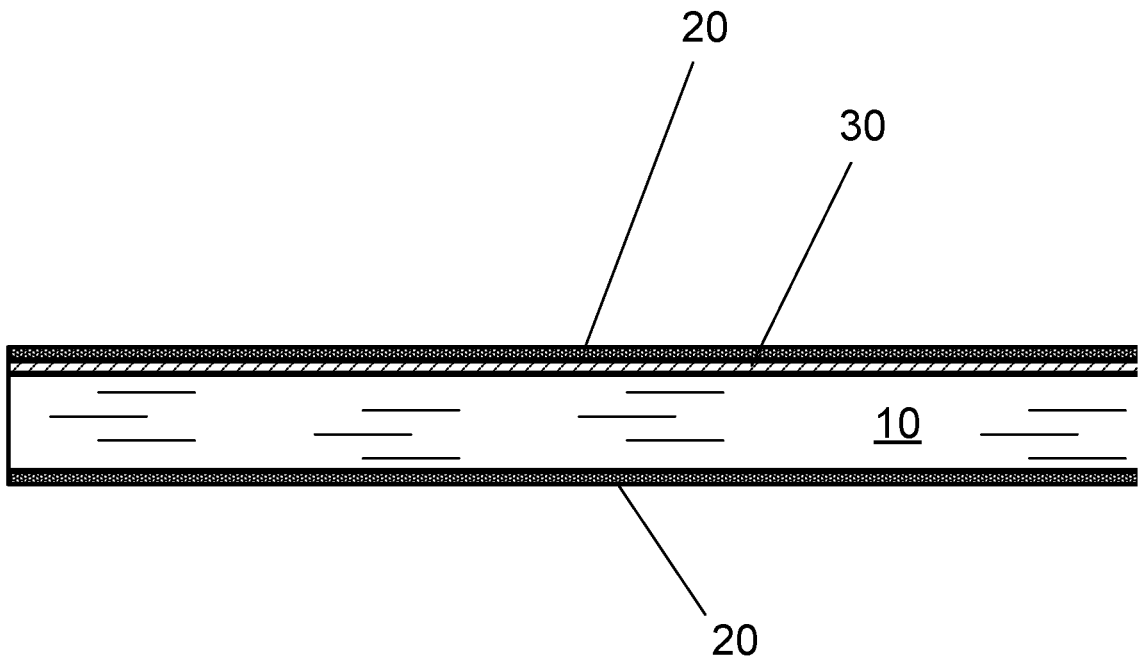
FIG. 4 shows a cross-section of an alternative arrangement of FR and WRB layers on a sheathing panel.
Figure 5:
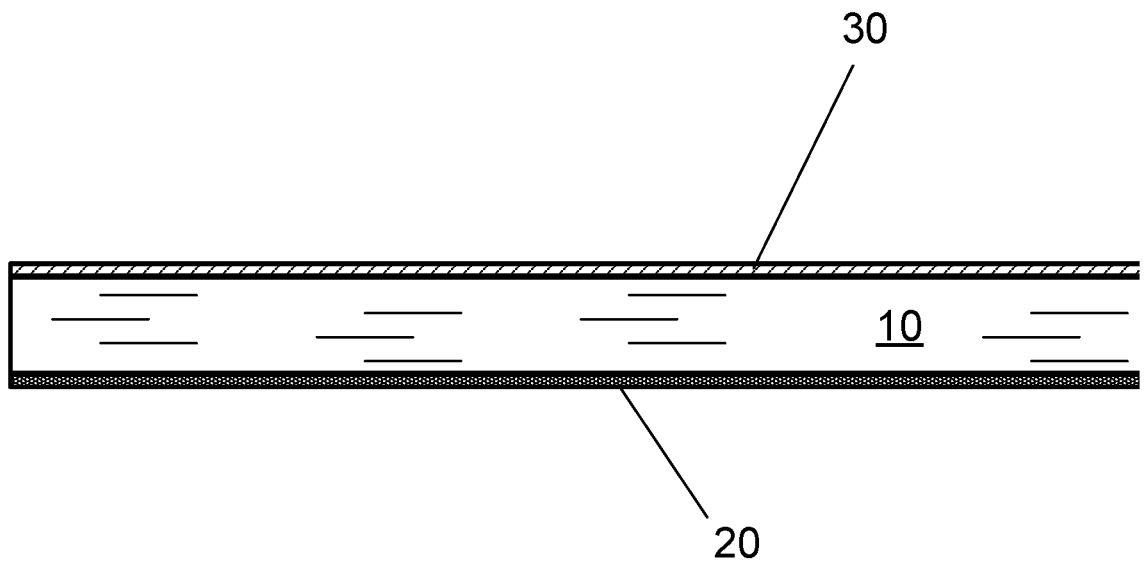
FIG. 5 shows a cross-section of an alternative arrangement of FR and WRB layers on a sheathing panel.

The FR panel provides a fire-code-approved product that provides structural performance and fire resistance in walls and roofs in residential, single- or multi-family, or commercial construction. In one embodiment, the panel comprises an OSB sheathing panel 10 with a FR coating 20 applied to at least one face of the panel (the coating may be applied to one face or both faces). In one exemplary embodiment, as seen in FIG. 5, the FR coating is applied on the face of the panel opposite the WRB 30. In another exemplary embodiment, the FR coating is applied on the face of the panel with the WRB, with the WRB overlying or underlying the FR coating layer, as seen in FIGS. 2 and 3. FR coating may also be applied to both faces of the OSB panel, with a WRB overlying or underlying the FR coating layer on one of the faces, as see in FIGS. 3 and 4.

In embodiments, the FR coating comprises one or more of a non-combustible magnesium oxide coating, a non-combustible fiberglass reinforced magnesium oxide coating, a surface applied chemical treatment, and an intumescent coating. This coating allows the panel to be used in approved 1- and 2-hour UL-listed fire resistance wall assemblies. In one embodiment, a fire-resistant coating, as described herein is applied to an OSB panel, resulting in a sheathing product that has a class-A extended (30 minute) flame spread rating and is rated in various 1-hour and/or 2-hour UL listed wall assemblies.

Figure 6:
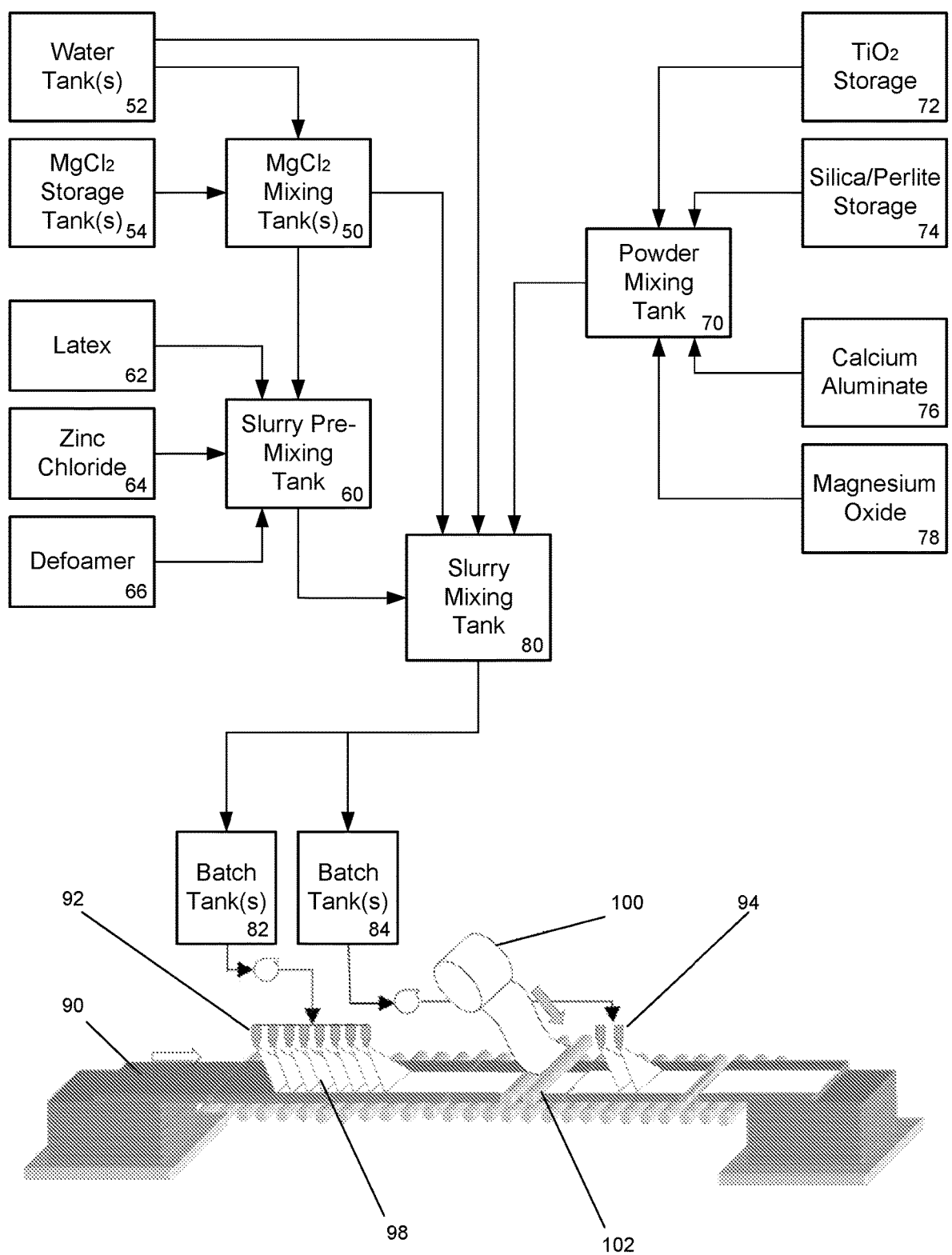
FIG. 6 shows a product flow diagram and flowchart for factory application of a FR treatment to an OSB panel to which a WRB has been or will be applied.

FIG. 6 shows a product flow diagram and flowchart for factory application of a FR to an OSB panel to which a WRB has been or will be applied. In one embodiment, the manufacturing process generally comprises two major phases: (1) the mixing and formation of the component materials to create the FR slurry, and (2) the application of the FR slurry to the substrate panel by direct coating of the panel with the FR slurry (and possibly fiberglass).

With regard to the first phase, the manufacturing section of the plant can be organized into "stations." Raw materials are certified by the supplier as to content and purity of the material, and typically are received with a certificate of analysis or third-party label. The raw materials can be stored in protected inventory space until needed. Fluid materials include $MgCl_2$ 54 and water 52. $MgCl_2$ and water are mixed together in mixing tanks 50. At least a portion of the resulting $MgCl_2$ and water solution is then introduced to a slurry mixer (mixing tank) 80 for mixing with solid materials (described below) to form the FR slurry material. A portion of the resulting $MgCl_2$ and water solution can be diverted to a slurry pre-mixing tank 60, where zinc chloride 64, latex 62 and a defoamer 66 are added and blended. This pre-mixing-tank mixture is then introduced to the slurry mixing tank 80 by itself or in addition to $MgCl_2$ and water solution from the mixing tank 50 or water directly from a water tank 52.

Dry materials (typically in powder form) can include any one or more of $TiO_2$ 72, silica or Perlite 74, calcium aluminate 76, and industrial grade, high purity magnesium oxide (MgO) 78. In several embodiments, the magnesium oxide may be products available commercially as Baymag 30 and Baymag 40. The powders can be mixed in a powder mixer (mixing tank) 70, then introduced to the slurry mixer 80 to be combined with any one or more of the solutions/mixtures described above, thereby forming a batch of viscous liquid slurry. The viscosity of the slurry avoids settling of the dry materials. In embodiments, the batch has a shelf life of less than about two hours (with occasional agitation of the slurry), so it is immediately brought to batch tanks 82, 84 at a coating station for application as described below.

At the coating station, the slurry can be pumped to a first coating apparatus 92 (such as, but not limited to, a set of sprayers, reverse roll coater, or curtain coater). The slurry 98 can be applied to the face of a substrate panel 90 as it passes under the first coating apparatus 92. In some applications, a form of fiberglass 100 is added to the top of the slurry after this initial slurry application. Fiberglass can be added as a slurry-saturated fiberglass veil or strand mat, or in the form of chopped fiberglass strands. For example, a fiberglass strand mat or veil is saturated with slurry by being run through the nip area of a modified roll coater 102, then gravity fed and laid over the initial base coat of slurry already applied to the substrate panel. A second coat of slurry can optionally be applied over the fiberglass strand mat or veil by a second coating apparatus 94 in the same or similar manner as described above (i.e., sprayers, reverse roll coater, curtain coater). In embodiments, the second coat of slurry is the final slurry coat. Slurry can be applied over the entire surface of the substrate to achieve complete coverage and uniform consistency and thickness.

If chopped fiberglass strands are used, the strands can be applied directly to the initial slurry coating. Pre-cut strands of fiberglass can be dispersed through a hopper/spreader apparatus, which disperses the glass through a slotted spreader tube via a corkscrew auger. The strands drop through slots in the spreader tube and fall via gravity to the slurry coated face of the panel. Alternatively, continuous strands of fiberglass filament (gun roving fiberglass strands) may be chopped with a rotating chopper mounted on an oscillating or fixed arm. In embodiments, air-assisted distribution causes the chopped fibers to be spread evenly across the face of the panel. The air-assisted distribution apparatus also can incorporate an amount of the slurry sprayed with the chopped fibers. A final coat of slurry can then optionally be applied over the fiberglass strands by a coating apparatus as described above (i.e., sprayers, reverse roll coater, curtain coater). Slurry can be applied over the entire surface of the substrate to achieve complete coverage and uniform consistency and thickness.

The rate of fiberglass added is determined by the weight of the fiberglass mat, or the flow of glass fiber over a period of time, calibrated based on production line speed to be an acceptable percentage (i.e., 2.0% to 10.0%) of total added weight. For example, a fiberglass strand mat weighing 1.70 to 6.25 lbs/csf (lbs per hundred sq. ft.), represents a range of 2.0% to 10.0% glass by weight for certain forms of fire-rated OSB sheathing. The rate of chopped fiberglass flow may be adjusted by modifying the amount of air pressure/air flow moving to the air powered glass chopper, or by adjusting the line speed of the conveyor carrying the substrate panel through the application station. Chopped fiberglass calibration may occur at the same time as slurry application weight calibration.

All of the raw material ingredients making up the slurry batch can be weighed and/or measured for each batch, with raw material weights entered on a slurry mix data sheet, along with the final volume of the completed mixture. A calibration procedure can be used to ensure that minimum amounts of the slurry are applied to each substrate panel. The net increase in the weight of the substrate panel can be determined by weighing the panel before and after completion of the slurry application process. Individual boards can be identified as calibration boards, and can be weighed untreated, coated, and then re-weighed to determine finished weight. The net gain in weight is considered the slurry application rate. If net weight gains are too high or too low (i.e., under a minimum allowable net weight gain), adjustments can be made to the slurry application. Additional boards can be weighed by this process until the desired target weights are achieved.

Once the appropriate amount of slurry, and fiberglass (if any), has been applied to the substrate panel, the coated panel can be placed in a curing oven under curing heaters which elevate the surface temperature over a maximum of three minutes from ambient temperature to a maximum oven exit temperature of 160° F. This heating is optional, but has the advantage of catalyzing the liquid slurry to set-up into a cured solid more rapidly than curing at ambient temperature. The slurry material crystallizes in the intercellular spaces in the substrate panel, thereby forming a close, tight bond.

If the treated panel product is in final form (such as where the panel substrate already has a WRB applied to one face and the slurry applied to the same or opposite face), it is then labeled, edge-trimmed, and packaged for shipment. If the slurry is to be applied to both faces, after curing of the slurry on the first face, an FR treatment such as the slurry is applied to the other face in a similar manner to that described above.

It is noted that, in some embodiments, a WRB, such as, but not limited to, a fluid or liquid-applied WRB, can be applied to the panel after the FR treatment such as the slurry. An example of a permeable elastomeric membrane adhered in this fashion is disclosed in U.S. patent application Ser. No. 15/365,731, filed Nov. 30, 2016, which is incorporated herein in its entirety by specific reference for all purposes. In this embodiment, the WRB can be applied on a face without the FR treatment, or may be applied over the FR treatment.

As an alternative to FR-treated OSB panels, panels 10 can comprise glass mat sheathing or FRT (fire rated treated) plywood, for example. The WRB, if needed, can then be applied in a similar manner.

In prior art applications, the FR panel would be installed as regular sheathing at a job site, and a code-approved WRB system or material would subsequently be applied. Examples of these secondary WRB systems include housewrap (e.g. Tyvek®, E. I. Du Pont De Nemours And Company, Wilmington, DE; Typar®, Fiberweb, Inc., Old Hickory, TN), peel-and-stick membranes, or a fluid/liquid applied water resistive barrier. However, these systems all rely upon skilled labor for installation at the job site, and possess other problems. Generally, these systems cannot be installed during inclement weather, and require the sheathing be free of defects and provide a clean surface free of debris.

The present invention, in contrast, permits application of a WRB to the FR panel at the manufacturing facility, prior to shipping or prior to installation at a job site (and thereby avoiding the problems noted above). In one exemplary embodiment, the WRB comprises a resin-impregnated paper overlay applied and adhered to a face of the FR panel pre-press or post-press. The WRB is bulk water resistant and water vapor permeable, or substantially bulk water resistant and water vapor permeable. In several embodiments, the FR treatment and the WRB do not comprise paint or paint primer. Paint and paint primers typically are applied at the job-site prior to or after installation of the panels.

In several embodiments, the panels are gapped during installation according to appropriate guidelines for the structural sheathing (e.g., ⅛"). The gaps between the panels can be sealed on-site after installation using a WRB sealant means, such as, but not limited to, (1) a fluid applied spray WRB sealant of similar chemical makeup to the coating applied to the face of the panel, (2) tape that bridges the gap (e.g., approximately 3" in width), or (3) self-troweling sealant applied using an electric caulk gun. These sealant means may be vapor permeable, although in several embodiments the sealant means is not vapor permeable. When installed, the panel system provides the structure with an effective water resistive barrier (i.e., resists bulk water) and an effective air barrier system that is fire-rated and structural.

The present invention possess several advantages over the prior art. It provides a superior air barrier system that does not allow air movement between the FR OSB face and the applied WRB, and allows a savings in time and labor, as a secondary contractor is not needed to apply the WRB after a FR panel is installed. Further, coating the panels in a controlled setting (e.g., manufacturing facility), allows the WRB to be consistently applied, and allows the WRB the opportunity to fully bond with the OSB panel. More specifically, the WRB is applied to the panel independent of weather conditions, and without interference from construction-related dirt, debris or humidity.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A fire-resistant structural panel, comprising:
 a base layer with a first surface and a second surface;
 at least one water-resistant layer substantially coating the first surface, the at least one water-resistant layer comprising a resin-impregnated paper overlay; and
 at least one fire-resistant layer substantially coating the second surface, the at least one fire-resistant layer comprising non-combustible magnesium oxide, the magnesium oxide layer applied as a coating of slurry to substantially cover the second surface;
 wherein the base layer, the at least one fire-resistant layer, and the at least one water-resistant layer form are pre-formed and then cured into an integral panel.

2. The panel of claim 1, wherein the base layer comprises wood or engineered composite material.

3. The panel of claim 1, wherein the base layer comprises oriented-strand board, fiberboard, particleboard, or plywood.

4. The panel of claim 1, further comprising a second fire-resistant layer substantially coating the at least one water-resistant layer.

5. The panel of claim 1, wherein the at least one water-resistant layer coats all of the first surface.

6. The panel of claim 5, wherein the at least one fire-resistant layer coats all of the second surface.

7. The panel of claim 1, wherein the at least one fire-resistant layer coats all of the second surface.

8. A fire-resistant structural panel, comprising:
 a base layer with a first surface and a second surface;
 at least one fire-resistant layer substantially coating the first surface or second surface, or both, the at least one fire-resistant layer comprising non-combustible magnesium oxide applied as a coating of slurry to substantially cover the first surface or second surface or both; and
 at least one water-resistant layer substantially coating the at least one fire-resistant layer opposite the base layer, the at least one water-resistant layer comprising a resin-impregnated paper overlay;
 wherein the base layer, the at least one-fire resistant layer, and the at least one water-resistant layer form are pre-formed and then cured into an integral panel.

9. The panel of claim 8, wherein the base layer comprises wood or engineered composite material.

10. The panel of claim 8, wherein the base layer comprises oriented-strand board, fiberboard, particleboard, or plywood.

\* \* \* \* \*